(12) United States Patent
Lutoslawski et al.

(10) Patent No.: US 8,714,942 B2
(45) Date of Patent: May 6, 2014

(54) DUAL POWER INPUT FLUID PUMP

(75) Inventors: Jaroslaw Lutoslawski, Bradford (CA); Richard Muizelaar, Mississauga (CA); Andrew Kowalski, Toronto (CA)

(73) Assignee: Magna Powertrain Inc., Concord (CA)

( * ) Notice: Subject to any disclaimer, the term of this patent is extended or adjusted under 35 U.S.C. 154(b) by 194 days.

(21) Appl. No.: 13/377,472

(22) PCT Filed: Jun. 9, 2010

(86) PCT No.: PCT/CA2010/000907
§ 371 (c)(1),
(2), (4) Date: Feb. 14, 2012

(87) PCT Pub. No.: WO2010/142042
PCT Pub. Date: Dec. 16, 2010

(65) Prior Publication Data
US 2012/0269653 A1 Oct. 25, 2012

Related U.S. Application Data

(60) Provisional application No. 61/185,254, filed on Jun. 9, 2009.

(51) Int. Cl.
*F04D 13/08* (2006.01)
*F04B 35/04* (2006.01)

(52) U.S. Cl.
USPC .......................................................... 417/319

(58) Field of Classification Search
CPC .............................. F01M 1/02; F01M 2001/02
USPC ....................................... 417/423.6, 364, 319
See application file for complete search history.

(56) References Cited

U.S. PATENT DOCUMENTS

| 7,828,095 B2 * | 11/2010 | Murata et al. ............. 180/65.51 |
| 2003/0070879 A1 | 4/2003 | Pringle et al. |
| 2007/0149336 A1 | 6/2007 | Sallstrom |
| 2008/0096711 A1 * | 4/2008 | Smith et al. ....................... 475/5 |
| 2009/0095548 A1 * | 4/2009 | Tamba et al. ............. 180/65.21 |

FOREIGN PATENT DOCUMENTS

| CA | 2516273 A1 | 8/2004 | |
| CN | 1664329 | 9/2005 | |
| DE | 10329215 A1 | 1/2005 | |
| WO | WO2008/020184 | * 2/2008 | ............. F02D 41/00 |
| WO | WO-2008-020184 A1 | 2/2008 | |

OTHER PUBLICATIONS

International Search Report for PCT/CA2010/000907, mailed Oct. 6, 2010; ISA/CA.
International Preliminary Report on Patentability (Chapter I of the Patent Cooperation Treaty) (ISA/CA), issued by the International Bureau of WIPO on Dec. 12, 2011.

* cited by examiner

*Primary Examiner* — Bryan Lettman
(74) *Attorney, Agent, or Firm* — Harness, Dickey & Pierce, P.L.C.

(57) ABSTRACT

A fluid pumping system for a vehicle having an internal combustion engine includes a housing, an electric motor, a controller to control the speed of the electric motor, a planetary gearset including a first member adapted to be driven by the internal combustion engine, a second member driven by the electric motor and a third member. A pump is driven by the third member of the planetary gearset. The housing contains the electric motor, the pump and the controller.

19 Claims, 12 Drawing Sheets

DUAL POWER INPUT FLUID PUMP

CROSS-REFERENCE TO RELATED APPLICATIONS

This application claims the benefit of U.S. Provisional Application No. 61/185,254, filed on Jun. 9, 2009. The entire disclosure of the above application is incorporated herein by reference.

FIELD

The present disclosure relates to a fluid pumping system for a vehicle. More particularly, the lubrication system includes an internal combustion engine as a first source of power and an electric motor as a second source of power.

BACKGROUND

Many automotive vehicles are equipped with a pump to transfer pressurized fluid to a number of locations throughout the vehicle. Most of the vehicles in production today are equipped with one or more pumps driven by an internal combustion engine of the vehicle. Examples of such pumps include fuel pumps, water pumps, internal combustion engine oil pumps, transmission oil pumps, superchargers, turbochargers, power steering pumps, air conditioning system compressors as well as fluid pumps that provide power to actuation systems for devices such as automatic transmissions, transfer cases, clutches and a host of other vehicle pumping requirements. While many of these pumps have operated satisfactorily in the past, a few concerns exist.

For example, many pumps are configured as fixed displacement pumps to minimize cost of the assembly. The fixed displacement pump is typically sized to provide a maximum flow rate and pressure based on a peak demand of the system. During much of the vehicle operation, however, peak demand is not required. As such, the pump may inefficiently provide a relatively high output when a relatively low output is required. The energy associated with providing the higher output instead of the lower output may be viewed as energy waste.

Furthermore, some newer vehicle configurations, including hybrid vehicles, do not operate the internal combustion engine at all times. In particular, it is contemplated that a hybrid vehicle may be constructed to include an internal combustion engine and some other source of power such as a battery and an electric drive motor. To realize maximum fuel economy, the internal combustion engine of the hybrid vehicle may be turned off and turned on many times during vehicle operation. As such, it may be undesirable to have the internal combustion engine as the sole source of power to the fluid pumps.

Pumps driven by electric motors may also be used within motor vehicle applications. However, a pump solely powered by an electric motor typically does not provide the same efficiency of operation as a pump mechanically driven by the internal combustion engine. Accordingly, a need in the art may exist for a pump having a dual source of power to improve vehicle energy efficiency and provide pumped fluids during different modes of vehicle operation as necessary.

SUMMARY

This section provides a general summary of the disclosure, and is not a comprehensive disclosure of its full scope or all of its features.

A fluid pumping system for a vehicle having an internal combustion engine includes a housing, an electric motor, a controller to control the speed of the electric motor, a planetary gearset including a first member adapted to be driven by the internal combustion engine, a second member driven by the electric motor and a third member. A pump is driven by the third member of the planetary gearset. The housing contains the electric motor, the pump and the controller.

A fluid pumping system for a vehicle having an internal combustion engine includes an electric motor and a planetary gearset including a first member adapted to be driven by the internal combustion engine, a second member driven by the electric motor and a third member. A pump is driven by the third member of the planetary gearset. A controller is operable to electrically interconnect fields of the electric motor to provide an electrical brake and selectively restrict rotation of the second member to change the gear ratio provided by the planetary gearset.

A method of pumping fluid within a vehicle including an internal combustion engine includes drivingly interconnecting a first member of a planetary gearset to an output of the internal combustion engine. An electric motor is drivingly coupled to a second member of the planetary gearset. A third member of the planetary gearset is drivingly connected to an input of a pump. The method includes determining a fluid demand and determining a target electric motor speed at which to rotate the second member to provide the fluid demand from the pump. The electric motor is controlled to rotate at the target speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
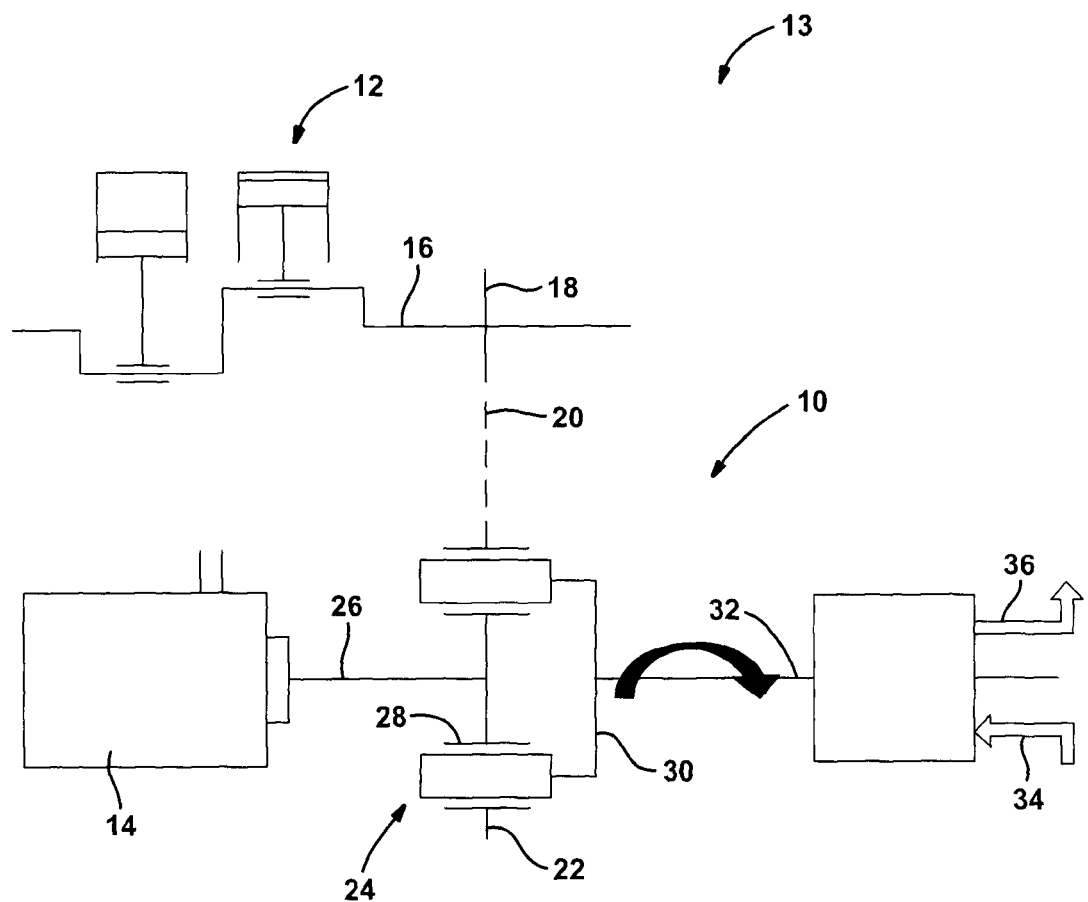
FIG. 1 is a schematic depicting a fluid pumping system including a dual power input pump.

FIG. 1 is a schematic depicting a dual power input pump 10 associated with an exemplary internal combustion engine 12 to define a fluid pumping system 13. It should be appreciated that pump 10 may be configured for use at any number of locations within a vehicle and may function as a fuel pump, water pump, internal combustion engine oil pump, transmission oil pump, supercharger, turbocharger, power steering pump, air conditioning system compressor and most any other fluid pump. Pump 10 may provide pressurized fluid to an actuator for a transmission, a transfer case, a clutch or the like. Internal combustion engine 12 provides a first source of power to pump 10 and an electric motor 14 provides a second source of power to pump 10. As shown in the schematic, an output shaft 16 from internal combustion engine 12 includes a drive sprocket 18 fixed thereto. A flexible drive member 20 drivingly interconnects drive sprocket 18 and a driven sprocket 22. As will be described in greater detail, driven sprocket 22 is associated with a planetary gearset 24 of pump 10. A hollow output shaft 26 is fixed for rotation with a sun gear 28 of planetary gearset 24. Output shaft 26 is driven by electric motor 14. A carrier 30 of planetary gearset 24 functions as the output and is coupled to a pump input shaft 32. Low pressure fluid enters at an inlet port 34 and high pressure exits at an outlet port 36 when input shaft 32 is rotated.

Figure 2:
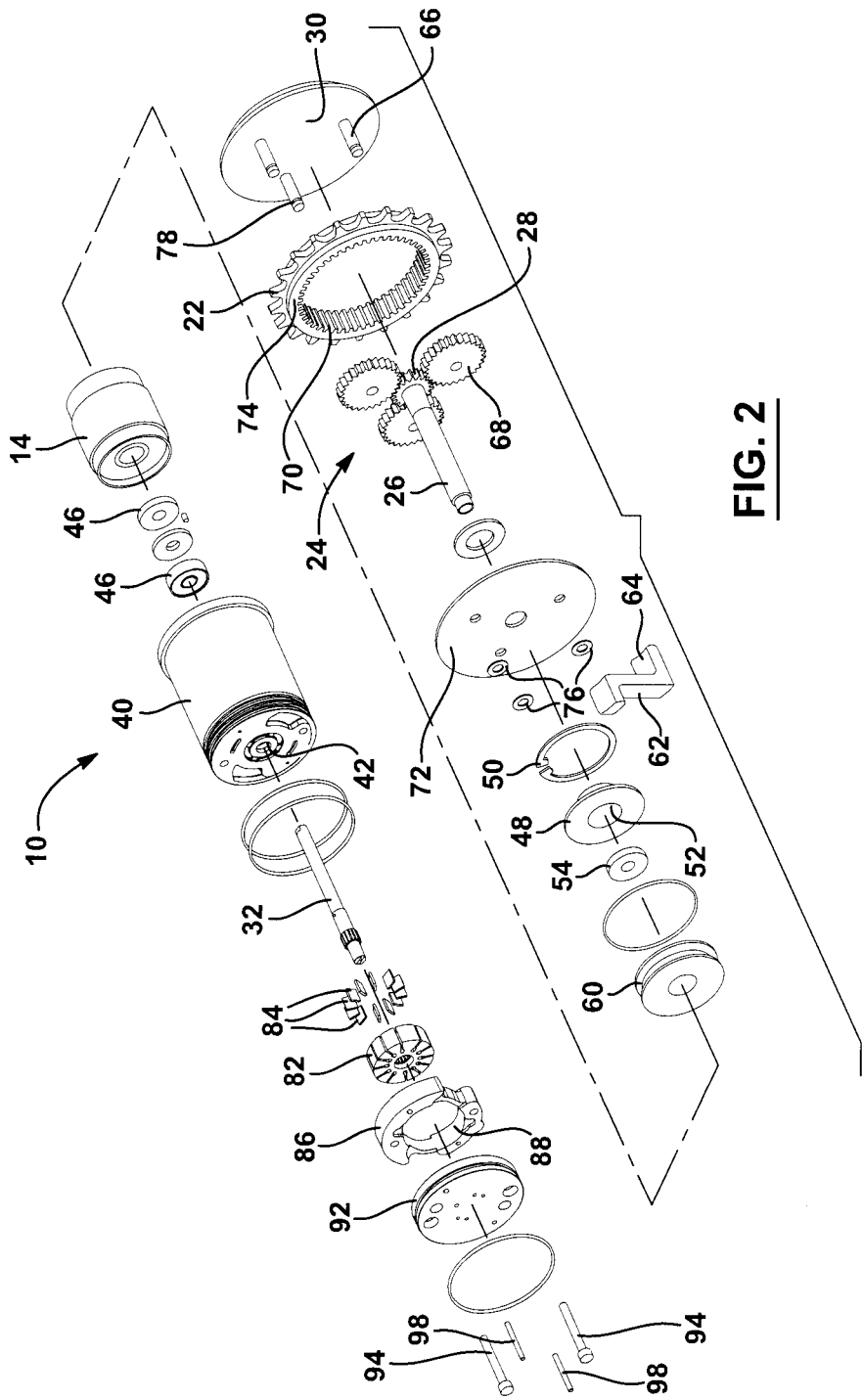
FIG. 2 is an exploded perspective view of a dual power input pump.

FIG. 2 provides a more detailed view of pump 10. In particular, pump 10 includes a housing 40 containing electric motor 14. It is contemplated that motor 14 is a brushless electric motor. Input shaft 32 extends through an aperture 42 formed in housing 40, through hollow output shaft 26, and is fixed for rotation with carrier 30. Output shaft 26 is integrally formed with sun gear 28 and is fixed for rotation with an output of motor 14. As such, at least a portion of shaft 26 is positioned within housing 40. Bearings 46 support input shaft 32 for rotation within housing 40. An end cup 48 is fixed to housing 40 by a retaining ring 50. End cup 48 includes a bore 52 in receipt of a bearing 54 rotatably supporting shaft 26. End cup 48 engages a seal to sealingly enclose motor 14 and a motor controller 60 within housing 40. An electrical connector 62 extends outside of housing 40 to provide a terminal 64 for electrical connection to provide power to motor controller 60 and motor 14.

Planetary gearset 24 includes a plurality of pinion shafts 66 fixed for rotation with carrier 30. Pinion gears 68 are each supported for rotation on a respective one of pinion shafts 66. Pinion gears 68 are in constant meshed engagement with sun gear 28 and an internal ring gear 70. Ring gear 70 is integrally formed with driven sprocket 22. A cover plate 72 is adjacent an end face 74 of combination ring gear 70 and driven sprocket 22. Cover plate 72 is fixed for rotation with carrier 30 and free to rotate relative to ring gear 70. A plurality of spring retainers 76 are positioned within grooves 78 formed on pinion shafts 66 to couple cover plate 72 to carrier 30.

At the opposite end of pump 10, a rotor 82 is fixed for rotation with input shaft 32. A plurality of circumferentially spaced apart vanes 84 are associated with rotor 82 such that each vane is fixed for rotation with and radially moveable relative to rotor 82. An intermediate plate 86 includes a cavity 88 in receipt of rotor 82 and vanes 84. Cavity 88 is positioned coaxially relative to an axis of rotation of rotor 82 such that chambers of increasing and decreasing volume are defined by vanes 84 as rotor 82 rotates. A pressure plate 92 sandwiches intermediate plate 86 between housing 40 and pressure plate 92. A plurality of fasteners 94 extend through pressure plate 92 and are threadingly engaged with housing 40. Alignment pins 98 may be coupled to housing 40 prior to installation of intermediate plate 86 and pressure plate 92 to assure proper component orientation.

Pump 10 may be configured as an 11.5 cc/rev high efficiency mechanical pump submerged in a reservoir to provide better pump priming. Electric motor 14 may be formed as a 150 watt brushless electric motor with integrated motor controller 60. Planetary gearset 24 may be constructed to provide a drive ratio of 5.28:1. This configuration may be achieved by forming ring gear 70 with 74 teeth, each of the pinion gears 68 with 30 teeth and forming 14 teeth on sun gear 28. Pinion gears 68 may be constructed from a plastic material such as nylon to reduce noise and cost. With this arrangement, it is contemplated that no recirculation circuit or valve is required to operate pump 10.

As an example, pump 10 may be configured as a transmission oil pump positioned with the sump of a transmission housing. Alternatively, pump 10 may be configured as a vehicle water pump. In the water pump arrangement, controller 60 may operate pump 10 to provide a very small or no coolant flow at engine start-up to provide reduced engine warm-up times. A sensor may be provided to output a signal indicative of an engine coolant temperature to controller 60. Controller 60 may operate pump 10 based on the temperature signal. Furthermore, flow may be maintained when internal combustion engine 12 is turned off to cool engine 12 or to provide heated air to a vehicle passenger compartment. In particular, controller 60 varies the rotational speed of electric motor 14 based on the speed of engine 12 to vary the output of pump 10.

Figure 5:
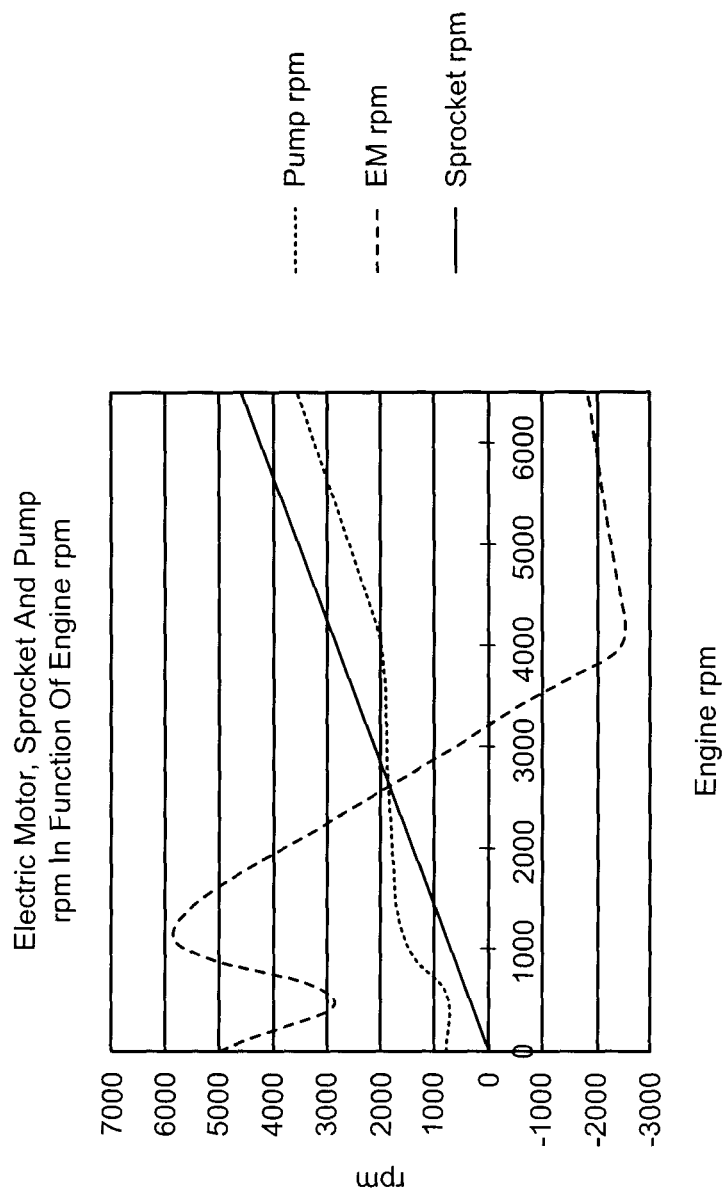
FIG. 5 is a graph depicting electric motor, sprocket and pump rpm as a function of engine rpm.
Figure 6:
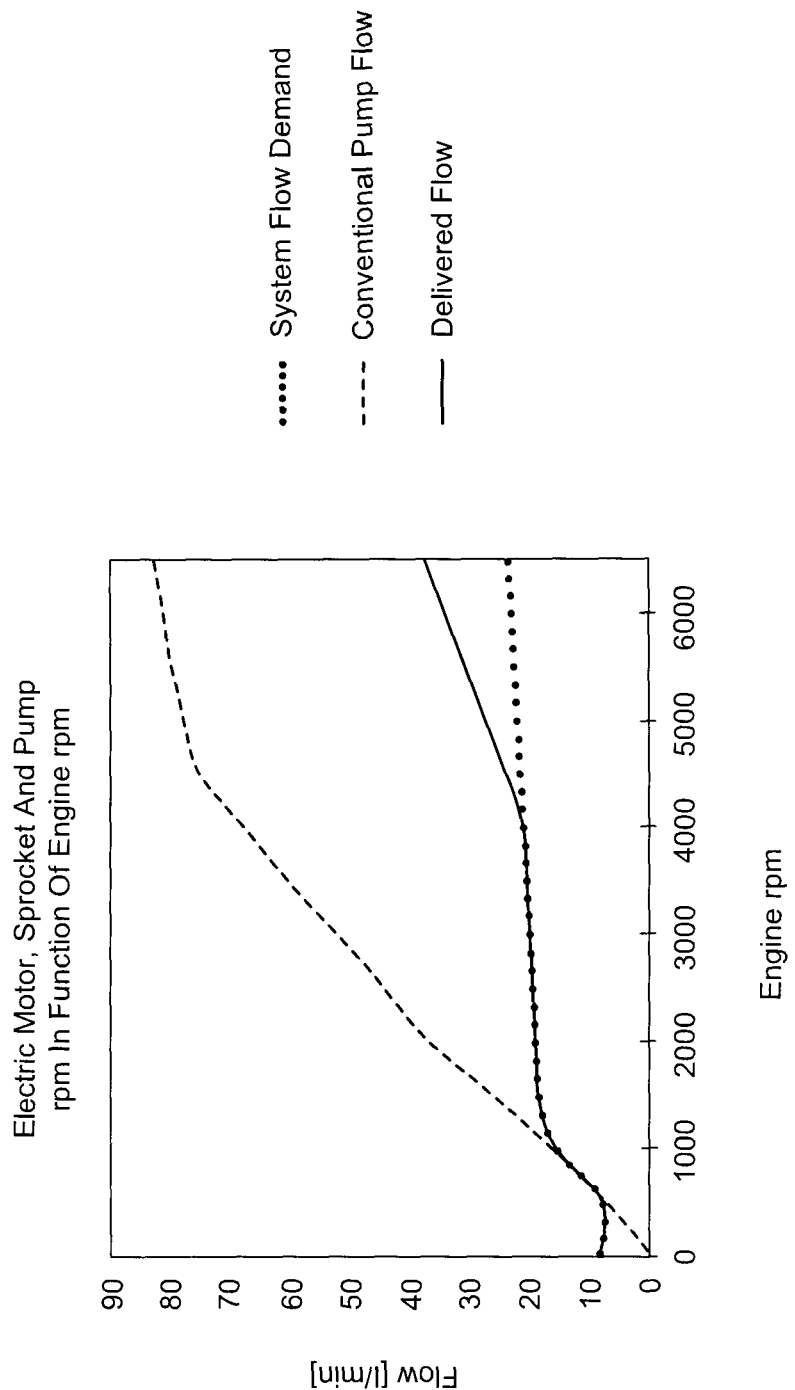
FIG. 6 is a graph depicting pump flow versus a transmission requirement and mechanical pump flow.

FIG. 5 depicts electric motor 14, driven sprocket 22 and rotor 82 rotational speeds as a function of internal combustion engine speed. FIG. 6 relates to a pumping system fluid demand and depicts system flow demand, flow provided by pump 10 and flow provided by a conventional mechanically driven pump. As is clearly depicted in FIG. 6, the delivered flow from pump 10 much more closely matches system demand than a conventional pump output. Energy efficiency is increased through the use of pumping system 13. The delivered flow may approximate the system demand for the entire operating range or may be arbitrarily set to diverge from the demand curve at any internal combustion engine speed.

Controller 60 is operable to determine a system flow demand. A number of inputs may be provided to controller 60 including internal combustion engine speed, ambient temperature, pumped fluid temperature, pressure, vehicle speed, among others, to calculate a system flow demand. Controller 60 is operable to control the rotational speed of electric motor 14. Controller 60 determines a target electric motor speed based on the internal combustion engine speed to provide the system flow demand. Controller 60 outputs a signal to cause the output member of electric motor 14 to rotate at the target speed.

Operation of pump 10 may be described as follows: When internal combustion engine 12 is off and operating at zero rpm, electric motor 14 is controlled by controller 60 to rotate at approximately 5000 rpm to provide an 800 rpm input to rotor 82. When internal combustion engine 12 idles at approximately 500 rpm, the electric motor speed is reduced to approximately 2800 rpm to maintain a similar pump speed. When the internal combustion engine rotates at 1200 rpm, electric motor 14 will rotate at its full speed of approximately 5700 rpm to provide 1800 rpm at the pump. From this point, the rotational speed of electric motor 14 will be reduced to zero and then will rotate in an opposite direction up to 2500 rpm. Pump rpm of rotor 82 will remain relatively stable ranging from 1800-2000 rpm to meet the demand. Above an internal combustion engine speed of 4000 rpm, electric motor 14 speed will drop from 2500 to 1900 rpm due to a power limitation on the electric motor. Pump rpm may rise from 2000 to 3500 rpm and provide slightly more output than demanded.

Figure 7:
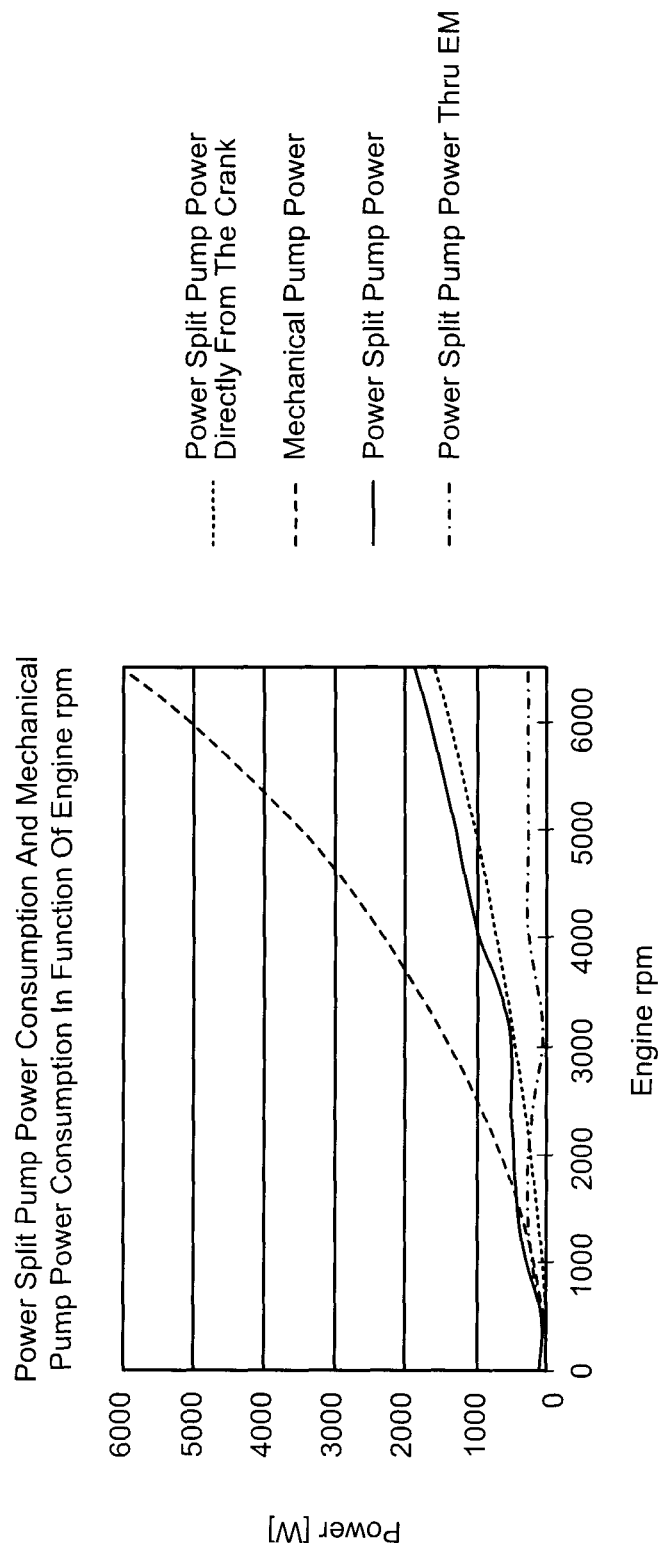
FIG. 7 is a graph depicting pump power consumption and mechanical pump power consumption as a function of engine rpm.

FIG. 7 presents a comparison of power consumption for pump 10 and a typical mechanical pump. The portion of power provided by internal combustion engine 12 and electric motor 14 are separately plotted in addition to the summed total power curve. As is depicted in the graph, at engine rotation speeds greater than 1650 rpm, pump 10 requires substantially less energy than a typical mechanical pump.

Figure 8:
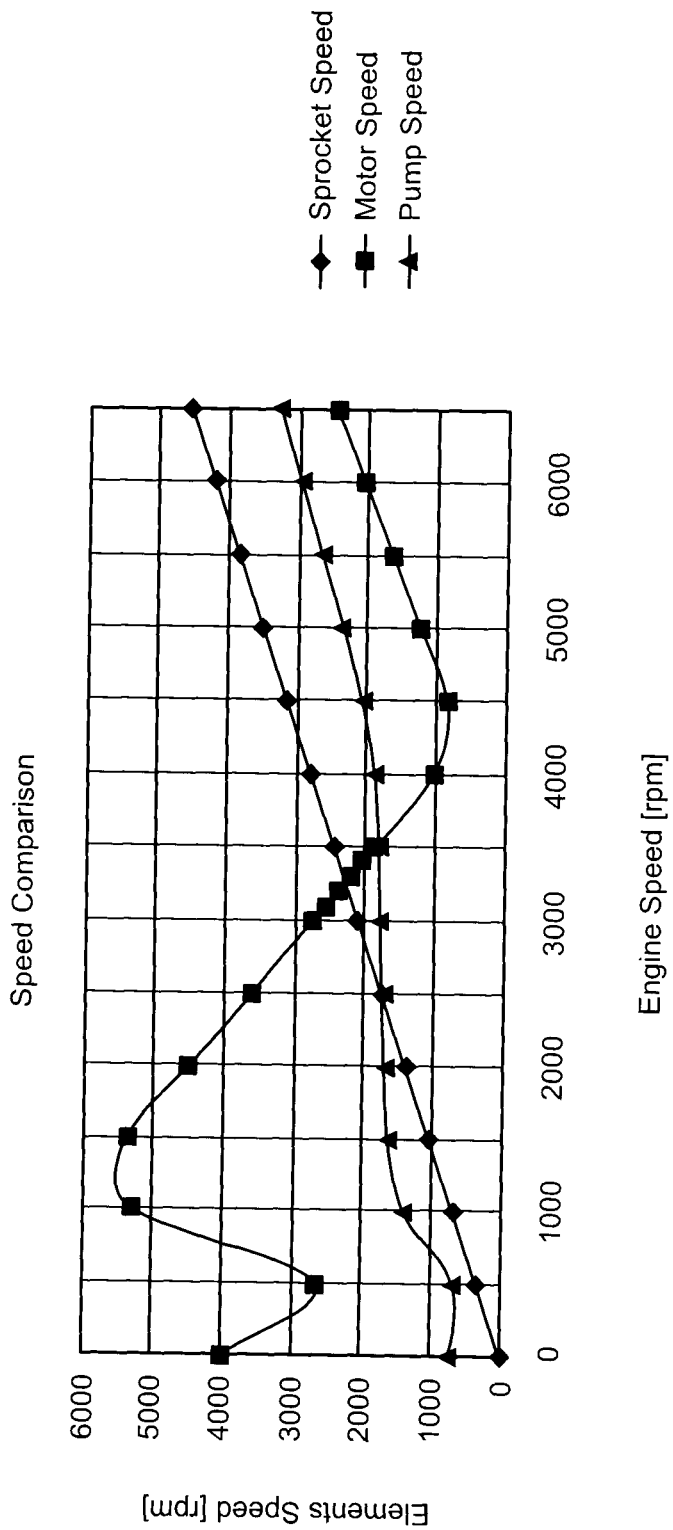
FIG. 8 is another graph depicting electric motor, sprocket and pump rpm as a function of engine rpm.

Alternatively, it may be desirable to provide a fluid pumping system that does not require the electric motor to operate in two different rotational directions. FIG. 8 depicts an alternative control scheme where the speed of electric motor 14 remains above zero and in the same rotational direction for all rotational speeds of internal combustion engine 12. As such, a simplified control algorithm for electric motor 14 may be implemented.

Electric motor 14 may also be controlled to act as a brake in lieu of rotating in the opposite direction as depicted in FIG. 5. The fields of electric motor 14 may be electrically connected to one another to form an electric or eddy current brake. Attempts to rotate the output shaft of electric motor 14 will be internally resisted within electric motor 14. The energy may be converted to heat energy or may be used for recharging an electrical energy storage device such as a battery. It is contemplated that electric motor 14 may be submersed within a sump of fluid to be pumped. At some operating conditions such as during cold weather start-up situations, it may be desirable to heat the fluid to be pumped without adding to another device such as a block or transmission fluid heater. Electric motor 14 may simultaneously act as a brake and a heater in this instance.

Figure 9:
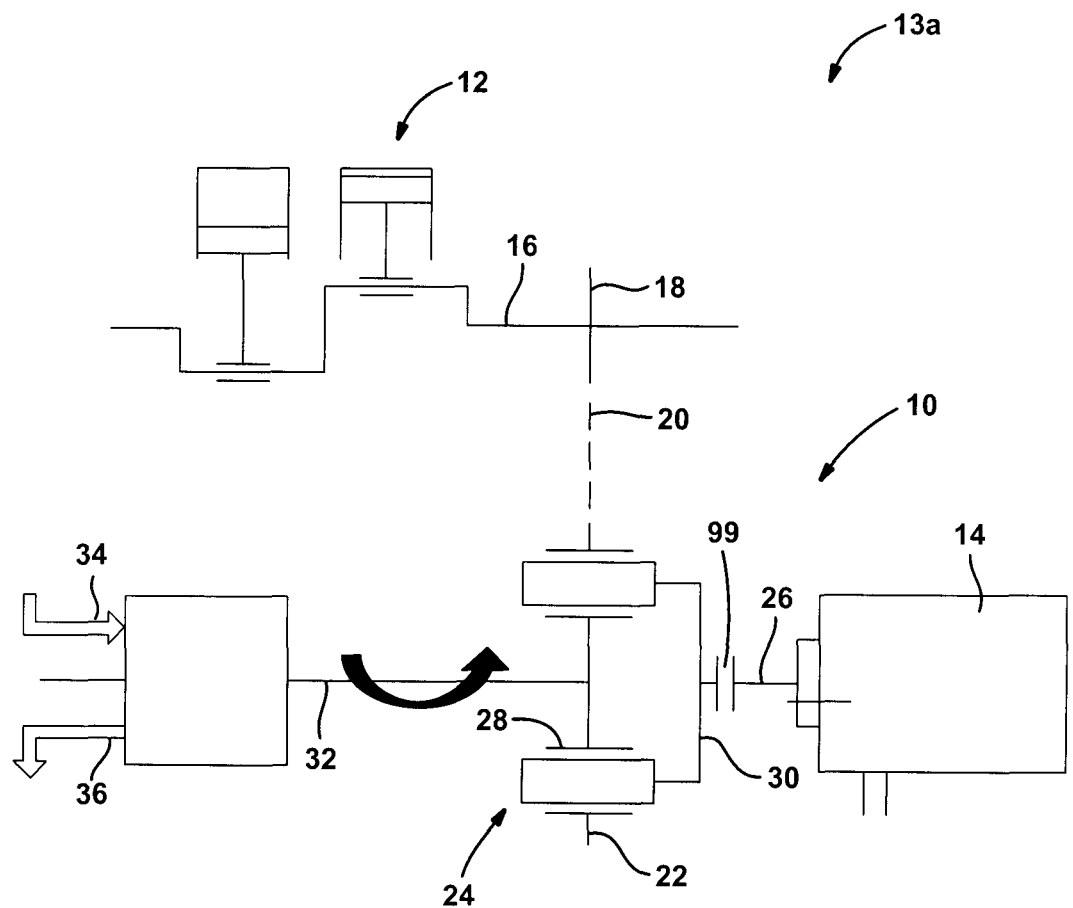
FIG. 9 is a schematic depicting another alternate fluid pumping system.

FIG. 9 provides a schematic of another alternate fluid pumping system identified at reference numeral 13*a*. Fluid pumping system 13*a* is substantially similar to fluid pumping system 13 except that a one-way clutch 99 is positioned between planetary gearset 24 and electric motor 14, and the driving and driven members have changed. In particular, electric motor 14 is operable to selectively drive carrier 30 via clutch 99. Sprocket 22 continues to be driven by internal combustion engine 12 via drive sprocket 18 and flexible member 20. Output from planetary gearset 24 is provided by sun gear 28 to input shaft 32 of the pump.

Figure 10:
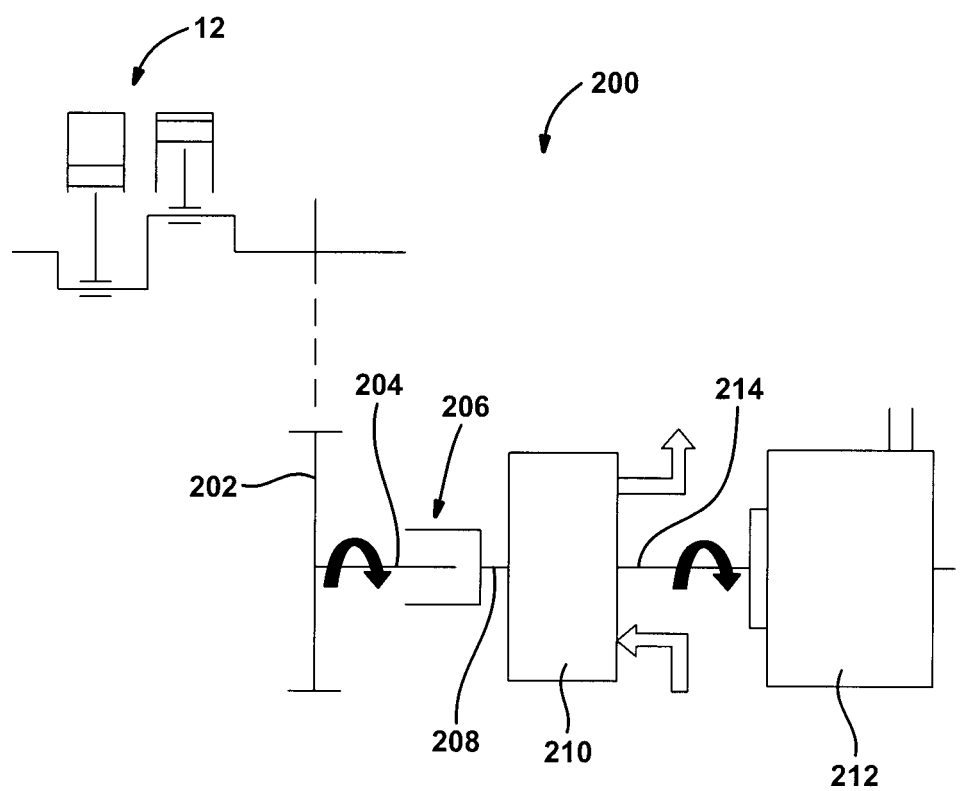
FIG. 10 is a schematic depicting another alternate fluid pumping system.

FIG. 10 provides a schematic of another alternate fluid pumping system identified at reference numeral 200. Internal combustion engine 12 provides power to a driven sprocket 202 fixed for rotation with a first input shaft 204. Input shaft 204 provides an input to a one-way clutch 206. An output of one-way clutch 206 is drivingly coupled to a first pump input shaft 208 of a pump 210. An electric motor 212 is drivingly coupled to a second input shaft 214 of pump 210. Rotational speed of pump 210 is determined by the speeds of first input shaft 208 and second input shaft 214. More particularly, the input shaft that rotates at the highest rate of speed defines the rotational speed of the pump.

Figure 11:
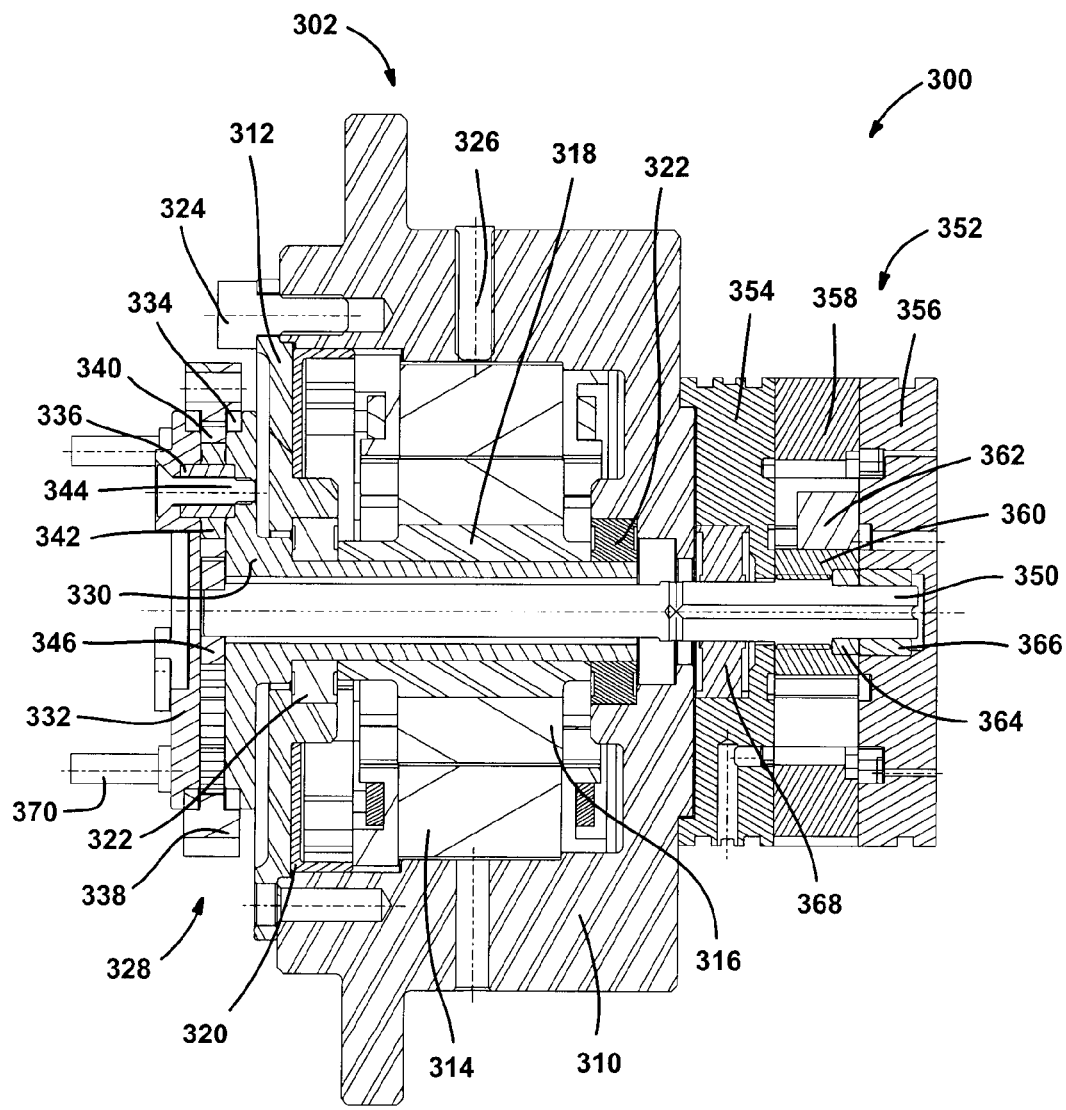
FIG. 11 is a cross-sectional view of an alternate fluid pumping system.
Figure 12:
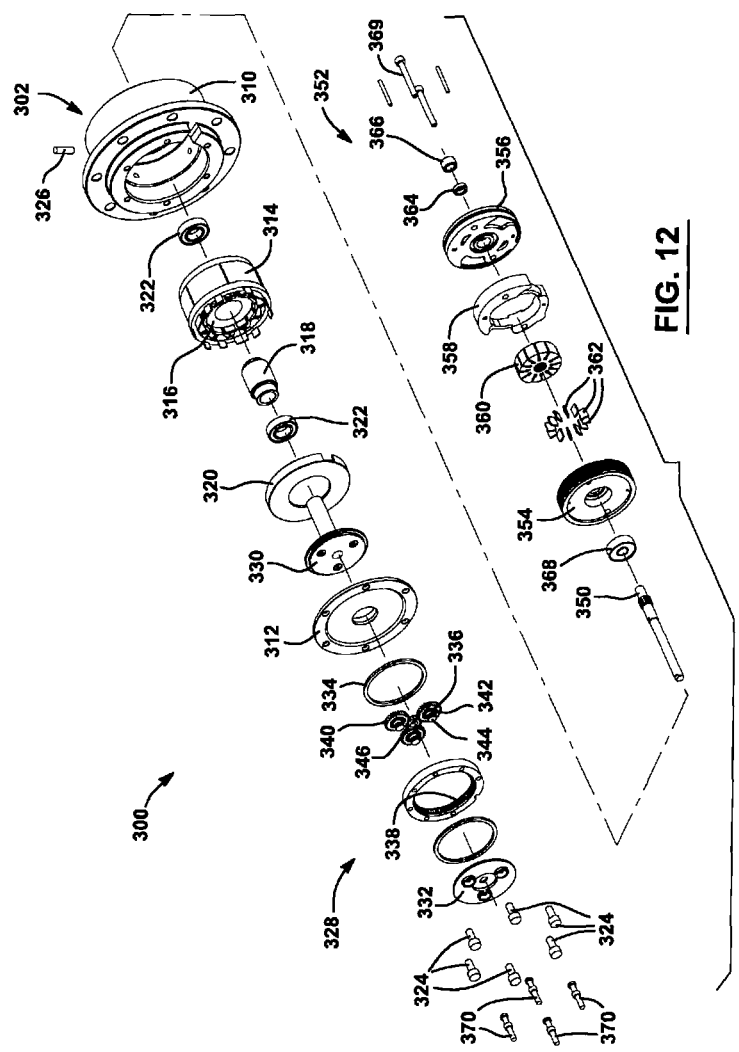
FIG. 12 is an exploded perspective view of the pumping system shown in FIG. 11.

FIGS. 11 and 12 depict another alternate fluid pumping system identified at reference numeral 300. Pumping system 300 is substantially similar to pumping system 13 with the exception that an output of the electric motor drives a carrier of the planetary gearset while an output of the internal combustion engine drives the ring gear of the planetary gearset. The sun gear provides torque to the pump.

Pumping system 300 includes a motor subassembly 302 having a motor housing 310, a motor cover 312, a stator 314, a rotor 316, a hollow rotor shaft 318, an insulator 320 and a motor bearing 322. Cap screws 324 fix motor cover 312 to motor housing 310. A set screw 326 secures stator 314 within housing 310.

A planetary gearset subassembly 328 includes a carrier 330, a carrier cover 332, a carrier spacer 334, a plurality of tubular pins 336, a ring gear 338, a plurality of planet gears 340 and a bearing 342. Screws 344 couple carrier cover 332 to carrier 330 sandwiching tubular pins 336 therebetween. Planetary gearset subassembly 328 also includes a sun gear 346. Planet gears 340 are in constant meshed engagement with both sun gear 346 and ring gear 338. A pump shaft 350 is fixed for rotation with sun gear 346 and extends through carrier 330 and hollow rotor shaft 318.

A vane pump subassembly 352 includes a front plate 354, a pressure plate 356, a mid-plate 358, a rotor 360, a plurality of vanes 362, a tubular spacer 364, a pump bushing 366, and a bearing 368. Threaded fasteners 369 extend through pressure plate 356, mid-plate 358 and front plate 354 to fix pump subassembly 352 to housing 310. Pumping system 300 may be configured to include the three separate modules of motor subassembly 302, planetary gearset subassembly 328 and vane pump subassembly 352 interconnected to one another by fasteners. Alternatively, a monolithic, one-piece housing may be formed to include some or all of the components of the motor, the planetary gearset and the pump.

Figure 3:
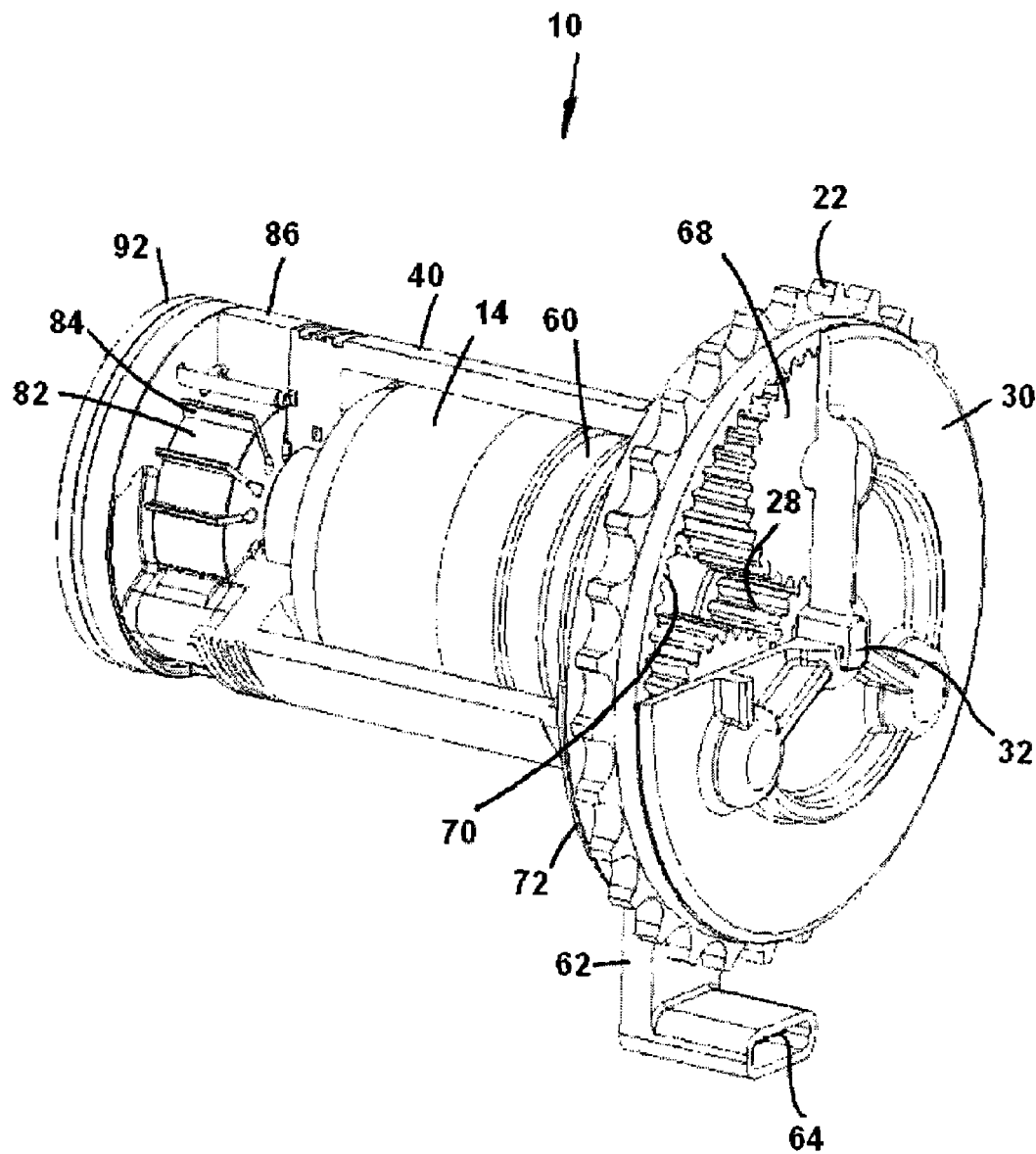
FIG. 3 is a fragmentary perspective view of the pump depicted in FIG. 2.
Figure 4:
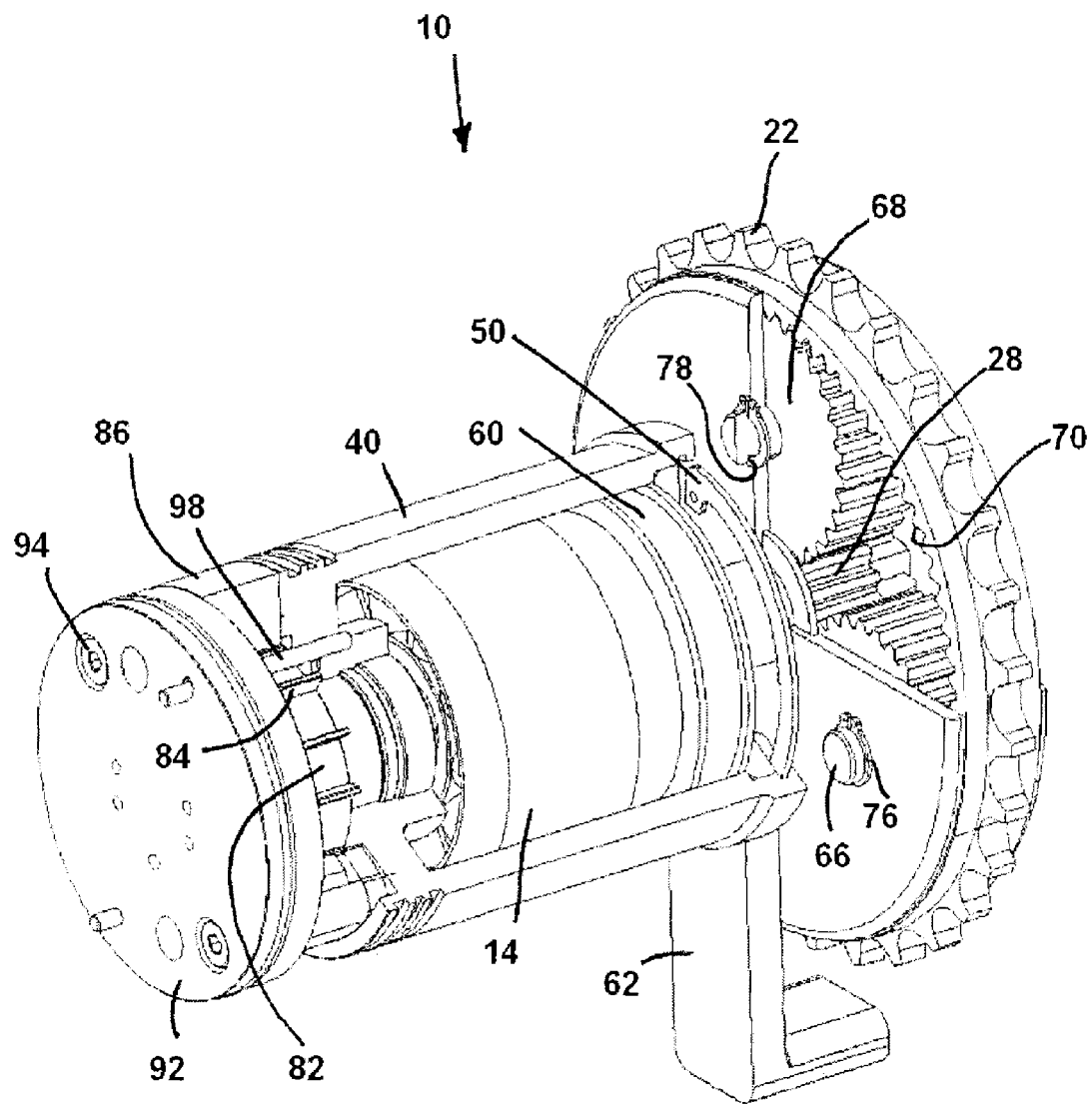
FIG. 4 is another fragmentary perspective view of the pump shown in FIG. 2.

As previously mentioned, power flow through planetary gearset subassembly 328 occurs by rotor 316 driving rotor shaft 318 and carrier 330. An output of the internal combustion engine is fixed for rotation with a plurality of drive pins 370 that are fixed to ring gear 338. Power is output from planetary gearset subassembly 328 via sun gear 346 to pump shaft 350. It should be appreciated that drive pins 370 are merely exemplary and that it is contemplated to provide a plurality of external teeth on ring gear 338 in similar fashion to driven sprocket 22 previously described and shown in FIG. 3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fluid pumping system for a vehicle having an internal combustion engine, the pumping system comprising:
   a housing;
   an electric motor;
   a controller to control a speed of the electric motor;
   a planetary gearset including a first member adapted to be driven by the internal combustion engine, a second member driven by the electric motor and a third member; and
   a pump driven by the third member of the planetary gearset, wherein the housing contains the electric motor, the pump and the controller, wherein the pump, the electric motor and the controller are submerged within a liquid fluid to be pumped.

2. The fluid pumping system of claim 1 wherein the pump includes a rotatable fluid pumping member positioned at one end of the housing and the planetary gearset positioned at an opposite end of the housing.

3. The fluid pumping system of claim 2 further including a pump input shaft extending through the housing, having one end fixed for rotation with the rotatable fluid pumping member and an opposite end fixed for rotation with the third member of the planetary gearset.

4. The fluid pumping system of claim 1 wherein the first member includes a ring gear, the second member includes a carrier and the third member includes a sun gear.

5. The fluid pumping system of claim 1 wherein the first member includes a ring gear, the second member includes a sun gear and the third member includes a carrier.

6. The fluid pumping system of claim 1 further including a drive sprocket adapted to be driven by the internal combustion engine, a driven sprocket fixed to the first member of the planetary gearset and a flexible drive member drivingly interconnecting the drive and driven sprockets.

7. The fluid pumping system of claim 6 wherein the third member is adapted to rotate about an axis offset from an axis of rotation of an internal combustion engine output shaft.

8. The fluid pumping system of claim 1 wherein the electric motor rotates in a first direction during a first range of internal combustion engine speeds and in a second opposite direction for a different range of internal combustion engine speeds.

9. The fluid pumping system of claim 1 further including a sensor for providing a signal indicative of an engine coolant temperature to the controller, wherein the controller varies the output of the pump based on the signal.

10. The fluid pumping system of claim 1 wherein the controller varies the speed of the electric motor based on the speed of the internal combustion engine.

11. The fluid pumping system of claim 1 further including a clutch positioned between the planetary gearset and the electric motor.

12. A fluid pumping system for a vehicle having an internal combustion engine, the fluid pumping system comprising:
  an electric motor;
  a planetary gearset including a first member adapted to be driven by the internal combustion engine, a second member driven by the electric motor and a third member;
  a pump driven by the third member of the planetary gearset; and
  a controller operable to electrically interconnect fields of the electric motor to provide an eddy current brake and selectively restrict rotation of the second member to change the gear ratio provided by the planetary gearset.

13. The fluid pumping system of claim 12 wherein the controller is operable to vary the speed of the electric motor.

14. The fluid pumping system of claim 13 wherein the controller is operable to determine a rotational speed of the internal combustion engine and determine a target electric motor speed based on the internal combustion engine speed.

15. The fluid pumping system of claim 12 wherein the electric motor is submersed within a fluid to be pumped and the controller applies the eddy current brake to heat the fluid to be pumped.

16. A method of pumping fluid within a vehicle including an internal combustion engine, the method comprising:
  drivingly interconnecting a first member of a planetary gearset to an output of the internal combustion engine;
  drivingly coupling an electric motor to a second member of a planetary gearset;
  drivingly connecting a third member of a planetary gearset to an input of a pump;
  determining a fluid demand;
  determining a target electric motor speed at which to rotate the second member to provide the fluid demand from the pump;
  submerging the electric motor within a liquid fluid to be pumped; and
  controlling the electric motor to rotate at the target speed.

17. The method of claim 16 further including rotating the electric motor in a first direction during a first range of internal combustion engine speeds and rotating the electric motor in a second opposite direction for a different range of internal combustion engine speeds.

18. A method of pumping fluid within a vehicle including an internal combustion engine, the method comprising:
  drivingly interconnecting a first member of a planetary gearset to an output of the internal combustion engine;
  drivingly coupling an electric motor to a second member of a planetary gearset;
  drivingly connecting a third member of a planetary gearset to an input of a pump;
  determining a fluid demand;
  determining a target electric motor speed at which to rotate the second member to provide the fluid demand from the pump;
  controlling the electric motor to rotate at the target speed; and
  operating the electric motor as an eddy current brake to restrict rotation of the second member.

19. The method of claim 18 further including heating a fluid to be pumped with the electric motor when operating as the eddy current brake.

* * * * *